J. E. EMERSON.
Saw-Teeth.
No. 142,781. Patented September 16, 1873.
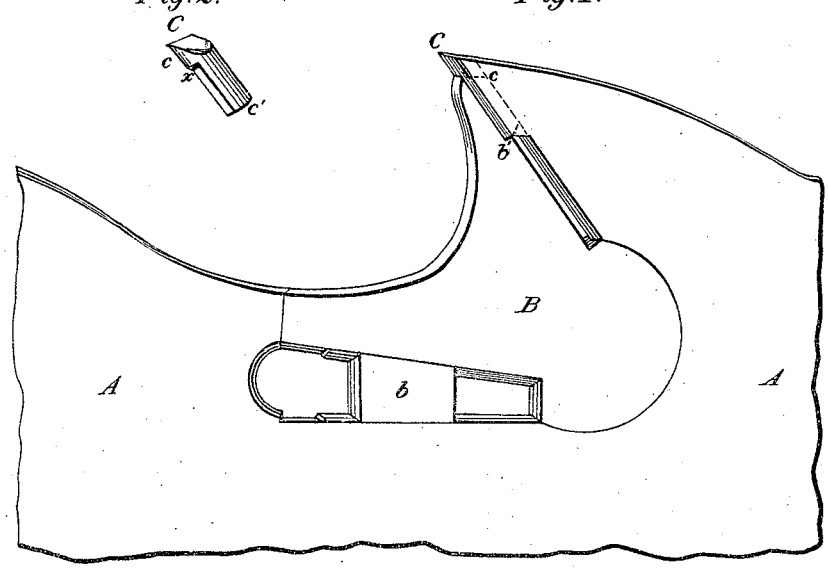

UNITED STATES PATENT OFFICE.

JAMES E. EMERSON, OF BEAVER FALLS, PENNSYLVANIA.

IMPROVEMENT IN SAW-TEETH.

Specification forming part of Letters Patent No. 142,781, dated September 16, 1873; application filed June 28, 1873.

*To all whom it may concern:*

Be it known that I, JAMES E. EMERSON, of Beaver Falls, in the county of Beaver, in the State of Pennsylvania, have made certain Improvements in Saw-Teeth for Saws used in Sawing Wood, of which the following is a specification:

This invention relates to removable teeth in saws; the object being to obviate what has heretofore been an objection in the general use of saws having removable teeth—to wit, the expense of the removable teeth; and it consists in such construction of teeth and their adaptation to a saw-plate that they can be used until dull at their cutting-edges, when they are removed and a new set inserted in their place; the teeth hereinafter described being an improvement upon the teeth patented to me April 29, 1873, numbered 138,236.

In the drawings, Figure 1 represents a section of a saw-plate with my improved form of tooth in position in the saw-plate. Fig. 2 represents a complete tooth; Fig. 3, the blank teeth cut from a bar to the right length; and Fig. 4, the bar from which the teeth are cut.

A represents a section of a saw-plate, with the clamp-piece B and wedge $b$ that holds the tooth firmly in position. $b'$ is a shoulder on the clamp-piece B, against which the inner end of the shank of the tooth firmly bears. C is a finished tooth and in place in the saw-plate. This is made from a bar of steel, made in the shape seen in Figs. 3 and 4, flat upon one side, that forms the forward side or front of the tooth, a circular or rounded back, $c'$, and widened out at its junction with the flat face to form the flanges or projections $e$ in the blank E or bar E', from which the blanks are cut, or the cutting-edges $c$ in the finished tooth C. The blanks E, from which the finished teeth C are made, are cut in specific lengths, so that the inner end will bear against the shoulder $b'$ of the clamp-piece B, which will prevent the tooth from being forced inward in the action of sawing. The rounded or circular side $c'$ of the tooth fits into a circular groove in the front side of the recess to receive the tooth, which enables the tooth to be securely held in its position, while there are no sharp angles, either in the groove in the saw-plate or on the back of the tooth, to cause the saw-plate to spread or crack, as may sometimes be the case with saws having an angular groove in the plate and an angular back of tooth fitting therein, and in this is the difference in and the improvement upon my former patent cited, as the teeth are formed from the bar that has a rounded or circular back instead of triangular form, cut to the proper length, the tang or shank formed in the manner by a drop-hammer and die, leaving the edges, as seen at $x$, to be the full width of the flat face of the bar, and form cutting-edges to cut the width of the kerf in sawing and plane each side thereof, and are then tempered as described in the patent cited.

Saw-teeth formed in this manner are found to be more durable and less liable to strain or crack the saw-plate than other forms heretofore in use, cost but little, and are intended never to be sharpened after being inserted in the saw-plate, and are sold in the market by the hundred.

Having thus described my invention, what I claim, and desire to secure by Letters Patent, is—

The saw-teeth herein described, as a new article of manufacture.

JAMES E. EMERSON.

Witnesses:
C. R. LISTER,
JOHN McCARTY.